(12) United States Patent
Durieux et al.

(10) Patent No.: US 12,474,003 B2
(45) Date of Patent: Nov. 18, 2025

(54) FEMALE FLUID CONNECTOR ELEMENT AND FLUID CONNECTOR COMPRISING SUCH AN ELEMENT

(71) Applicant: STAUBLI FAVERGES, Faverges-Seythenex (FR)

(72) Inventors: Christophe Durieux, Gilly sur Isere (FR); Serafim Marques Barroca, Albertville (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 198 days.

(21) Appl. No.: 18/164,948

(22) Filed: Feb. 6, 2023

(65) Prior Publication Data
US 2023/0250908 A1 Aug. 10, 2023

(30) Foreign Application Priority Data
Feb. 10, 2022 (FR) ...................................... 2201166

(51) Int. Cl.
*F16L 37/23* (2006.01)
*F16L 17/073* (2006.01)

(52) U.S. Cl.
CPC ............. *F16L 37/23* (2013.01); *F16L 17/073* (2013.01)

(58) Field of Classification Search
CPC ....... F16L 37/23; F16L 37/086; F16L 17/073; F16L 17/06
See application file for complete search history.

(56) References Cited

U.S. PATENT DOCUMENTS

| | | | |
|---|---|---|---|
| 2,708,124 A | 5/1955 | Robb | |
| 3,995,659 A * | 12/1976 | Cantore | .................. F16L 37/23 |
| | | | 251/149.6 |
| 4,182,370 A * | 1/1980 | Karcher | .................. F16L 37/32 |
| | | | 137/614.04 |
| 5,074,524 A | 12/1991 | Wade | |
| 10,738,927 B2 | 8/2020 | Tiberghien et al. | |

(Continued)

FOREIGN PATENT DOCUMENTS

| | | |
|---|---|---|
| DE | 2951576 A1 * | 7/1981 |
| EP | 2674658 A1 * | 12/2013 ............. F16L 21/08 |

(Continued)

OTHER PUBLICATIONS

Search Report for French Application No. 2201166 dated Sep. 6, 2022.

*Primary Examiner* — Zachary T Dragicevich
*Assistant Examiner* — James A Linford
(74) *Attorney, Agent, or Firm* — McDonald Hopkins LLC

(57) ABSTRACT

A connector element comprising a body, a locking mechanism and a seal. The seal comprises a base arranged facing, backward to a proximal surface and facing, forward to a distal surface of the body, as well as a lip. The lip extends parallel to a longitudinal axis of the body and forward, protruding from the base and defining a free front edge. The seal presents a peripheral notch that is arranged, radially to the longitudinal axis, between the base and the lip, which opens to the front of the seal and a bottom of which is delimited on the rear by a joining portion of the seal connecting the base and the lip. The seal is configured to press backward against the proximal surface, in alignment with the free front edge of the lip, according to a direction parallel to the longitudinal axis.

17 Claims, 11 Drawing Sheets

(56) References Cited

U.S. PATENT DOCUMENTS

| | | | | |
|---|---|---|---|---|
| 2010/0183361 | A1* | 7/2010 | Davis | F16L 37/40 |
| | | | | 29/428 |
| 2014/0116533 | A1* | 5/2014 | Edler | F16L 37/42 |
| | | | | 137/315.01 |
| 2017/0261139 | A1 | 9/2017 | Tiberghien et al. | |

FOREIGN PATENT DOCUMENTS

| | | | |
|---|---|---|---|
| EP | 3220034 A1 | 9/2017 | |
| GB | 1408537 A | 10/1975 | |
| KR | 101782903 B1 | 9/2017 | |
| WO | WO-0205874 A1 * | 1/2002 | ........ A61M 39/1011 |

\* cited by examiner

FEMALE FLUID CONNECTOR ELEMENT AND FLUID CONNECTOR COMPRISING SUCH AN ELEMENT

CROSS-REFERENCE TO RELATED APPLICATIONS

This application claims priority from French Patent Application No. 2201166 filed on Feb. 10, 2022. The content of this application is incorporated herein by reference in its entirety.

The present invention relates to a female fluid connector element allowing to constitute, with a complementary nipple, a connector ensuring the junction of two pipes for the circulation of a fluid, which can be gaseous or liquid.

It is known to make a fluid connector by means of two elements, one of which is a "clamp" type nipple and which can be held in position in the other element of the connector by means of locking members, such as balls or the equivalent.

In this context, EP-A-3 220 034 discloses a fluid connector element intended to cooperate with a clamp-type nipple and which comprises locking balls, as well as a seal that comes to bear against an outer edge or a frontal groove of the nipple in a connected configuration. This fluid connector element is generally satisfactory. However, due to the geometry of the clamp and the locking elements, there is a possibility of tilting of the clamp in the body of the fluid connector element, about an axis transversal to a longitudinal axis of the connector, even in the connected configuration. The sealing obtained with the seal is then not guaranteed. When the pressure outside the connector is greater than the pressure of the fluid passing through the connector, the pressure difference between the two sides of the seal may deform it, to the point of breaking the seal between the connector and the cavity in which it is housed, with a risk of leakage within the connector.

GB-A-1408537 discloses a quick connector, the female element of which carries a lipped seal with a lip turned backward that is radially deformed when the male and female elements of the connector are connected together. U.S. Pat. No. 2,708,124 and KR-A-101782903 disclose quick connectors, the female element of which carries a seal with an annular protrusion having a triangular cross-section. In these connectors, the male element cannot be a clamp fitting.

Similar problems can occur with known materials, during connecting and/or when the pressure inside the connector is greater than the pressure outside the connector.

It is these problems that the invention more particularly intends to remedy by proposing a new female connector element capable of cooperating with a clamp-type nipple, the sealing ability of which is improved, both during connecting and in the connected configuration of a fluid connector incorporating such a female connector element, whatever the pressure differential between the pressure outside the connector and the pressure of the fluid passing through the connector.

To this end, the invention relates to a female connector element capable of being connected with a complementary nipple for joining two fluid carrying pipes, this female connector element comprising a body for receiving the nipple, this body being centered on a longitudinal axis and delimiting, within the body an inner fluid flow channel that extends between a front face of the female element oriented toward the nipple during a press-fitting of the female element and the nipple, and a rear face of the female element oriented toward a pipe to which the female element is connected. The female connector element comprises a locking mechanism itself comprising a plurality of locking members, movable relative to the body, radial to the longitudinal axis, between an inner blocking position of the nipple in the body and an outer position releasing the nipple from the body, and a blocking ring mounted around the body and movable between a first position blocking the locking members in their inner position and a second position in which the blocking ring does not prevent movement of the locking members to their outer position. The female connector element also comprises a seal configured to cooperate with the nipple, this seal being housed within the body, around the inner channel, and comprising a base, arranged facing backward, to a proximal surface of the body and facing forward to a distal surface of the body, as well as a lip.

In accordance with the invention
- the lip extends parallel to the longitudinal axis and toward the front, protruding from the base and presenting a free front edge;
- the seal presents a circumferential notch which is arranged radially to the longitudinal axis, between the base and the lip, which opens out at the front of the seal and a bottom of which is delimited at the back by a joining portion of the seal connecting the base and the lip; and
- the seal is configured to press backward against the proximal surface, in alignment with the free front edge of the lip, according to a direction parallel to the longitudinal axis.

Thanks to the invention, the seal can press against the proximal surface of the body of the female connector element and press against the complementary nipple by means of the lip, these two support faces being in alignment with each other according to the longitudinal axis, which guarantees an effective sealing arrangement between the seal and the body and between the seal and the nipple when the connector elements are connected together, this sealing arrangement being equally suitable for the case of an outside pressure greater than the pressure inside the connector as for the case of an outside pressure less than the pressure inside the coupling. The base of the seal allows for precise positioning of the lip vis-a-vis the body of the female connector element, as well as vis-a-vis the complementary nipple, particularly a circumferential groove arranged on a front face of this nipple. The construction of the seal, with a base, lip and circumferential groove allows for relatively easy deformation of the lip during connection of the connector elements and in the connected configuration. As a result, the force required to connect the connector elements is reduced. A deformation of the lip in the connected state is still possible due to the pressures on both sides of the seal, in other words, the pressure differential between the outside and inside of the connector. The construction of the seal with a base, a lip and a notch also allows the lip to have a relatively long length, which facilitates its deformation, without increasing the longitudinal bulk of the seal too much.

According to advantageous but non-mandatory aspects of the invention, such a female connector element may incorporate one or more of the following features taken in any technically permissible combination:

In the unconnected configuration of the female connector element, a ratio between, on the one hand, a length of the peripheral notch measured parallel to the longitudinal axis and, on the other hand, a free length of the lip measured parallel to the longitudinal axis between the bottom of the peripheral notch and the free front edge of the lip, is between 0.4 and 0.6, preferably equal to about 0.5.

In the unconnected configuration of the female connector element, a ratio between, on the one hand, a free length of the lip measured parallel to the longitudinal axis between the bottom of the peripheral notch and the free front edge of the lip and, on the other hand, a maximum length of the seal, measured parallel to the longitudinal axis, is greater than or equal to 0.7.

In the unconnected configuration of the female connector element, the free front edge of the lip presents a convex shape.

In the unconnected configuration of the female connector element, at the same radial level, the seal extends continuously from the free front edge to a rear surface of the seal configured to press backward against the proximal surface.

In the unconnected configuration of the female connector element, the lip has a radial thickness, behind the free front edge, that is constant.

In the unconnected configuration of the female connector element, a ratio between, on the one hand, a radial thickness of the peripheral notch, and on the other hand, a radial thickness of the lip is less than or equal to 0.4, at a same level along the longitudinal axis.

In the unconnected configuration of the female connector element, at a level of the peripheral notch, the base has a radial thickness strictly greater than a radial thickness of the lip.

In the unconnected configuration of the female connector element,
a front axial surface of the body turned forward, faces, along a direction parallel to the longitudinal axis, the locking members when they are in their inner position;
the lip extends into a volume located, radially to the longitudinal axis, inside the axial front surface; and
the lip protrudes forward, relative to the axial front surface over a non-zero length.

The body comprises an inner radial wall arranged, radially to the longitudinal axis, inside the proximal surface and, axially along the longitudinal axis forward of the proximal surface and, in the unconnected configuration of the female connector element, an inner radial surface of the lip faces, radially to the longitudinal axis of the inner radial wall, with a non-zero thickness radial clearance and the lip protrudes forward from the inner radial wall.

The inner radial wall extends forward relative to the proximal surface according to a direction parallel to the longitudinal axis, to the level of, or recessed from, a front end of the peripheral seal notch pressing backward against the proximal surface.

The seal base is mounted, according to a direction parallel to the longitudinal axis, between the proximal surface and the distal surface, with a longitudinal clearance of less than 5% of a maximum longitudinal dimension measured between the proximal axial surface and the distal surface.

In the unconnected configuration of the female connector element, a minimum inner diameter of the seal is defined by an inner dimension of the lip.

The base is in an outer radial contact with the body.

According to a second aspect, the invention relates to a connector which comprises a female connector element and a complementary nipple, the nipple being provided with an inner channel fluid passage, an outer cavity for receiving the locking members of the female connector element in the connected configuration of the connector, a front face which surrounds the inner channel and a circumferential groove arranged on the front face. In accordance with the invention, the female connector element is as mentioned above and, in the connected configuration of the coupling, the lip of the seal of the female connector element is engaged in, and in contact with, the circumferential groove.

Advantageously, the female connector element is as previously described. In accordance with the invention, when the seal is pressing backward against the proximal surface, in alignment with the free front edge of the lip according to a direction parallel to the longitudinal axis, a ratio between, on the one hand, a length over which the lip protrudes forward from the front axial surface of the body of the female connector element and, on the other hand, a maximum depth of the circumferential groove relative to the front face, is greater than or equal to 1, preferably greater than or equal to 1.5.

The invention will be better understood, and further advantages thereof will become clearer in the light of the following description of two embodiments of a female connector element and a connector in accordance with its principle, given by way of example only and made with reference to the appended drawings, in which.

Figure 1:
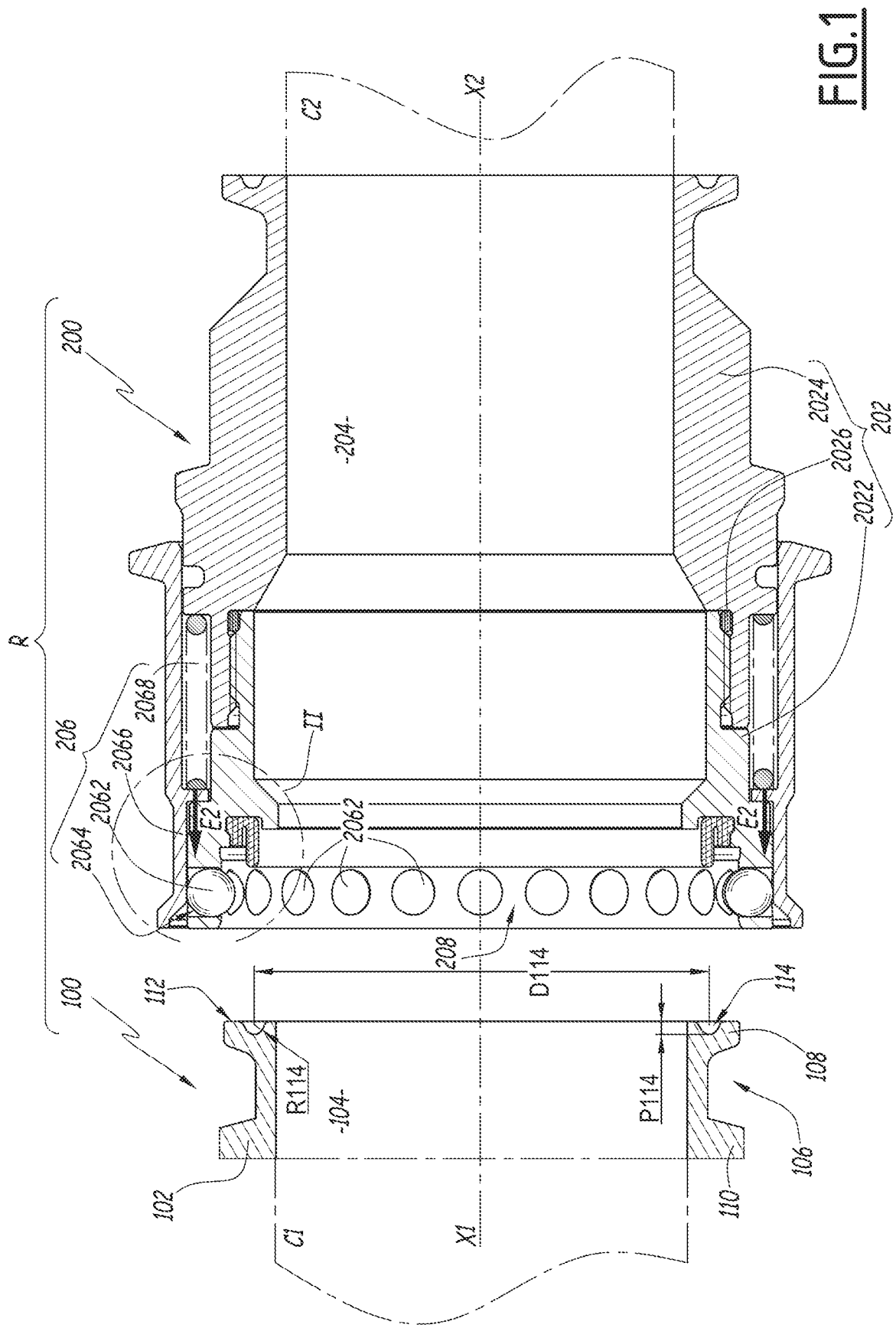
FIG. 1 is an in principle longitudinal section of the male and female elements of a fluid connector in accordance with the invention, in an unconnected configuration.

The fluid connector R shown in FIGS. 1 to 8 comprises a male nipple 100 and a female element 200 intended to be connected to the male nipple 100. The nipple 100 and the female element 200 are complementary.

In this example, the connector R is configured to connect two gas flow lines.

The nipple 100 is a clamp type nipple, as defined by DIN-32676 or ASME BPE-2007 for a nipple with a flange diameter equal to 25 mm. For a nipple with an outer flange diameter equal to 34, 50 or 64 mm, this is defined by ISO 2852, DIN 32676, BS 4825-3 and ASME BPE-2007.

This nipple comprises a one-piece body 102, preferably made of metal, which defines a central inner fluid flow channel 104, that channel is connected, in a manner known per se and on the back of the body 102, to a pipe C1, in this example gas. For the clarity of the drawing, this pipe is shown as a mixed line only in FIG. 1. The nipple 100 does not have a valve for closing its inner channel 104.

The nipple 100 is centered on a longitudinal axis X1 which constitutes an axis of symmetry for the body 102. In particular, the inner channel 104 is cylindrical with a circular cross section centered on the axis X1.

On its outer radial surface, which extends radially about the longitudinal axis X1 and is oriented away from this axis, the body 102 is provided with a peripheral groove 106 which constitutes an outer cavity for receiving one or more locking. These locking members may be balls of the female element 200, as will be apparent from the following explanations. The groove 106 is delimited, axially along the axis X1, toward the front, by a flange 108 and, toward the rear, by a collar 110, this collar being optional insofar as the body 102 can maintain the reduced diameter of the bottom of the groove 106 as it moves toward the rear of the male nipple 100.

In this regard, the front face of an element 100 or 200 of the fluid connector R is defined as the face of that element oriented in the direction of press-fitting or connecting, in other words, oriented toward the complementary connector element during the press-fitting. Conversely, the rear face of a fluid connector element R is defined as the face oriented toward the pipe to which that connector element is connected, and opposite the complementary element. Thus, in the example of FIGS. 1 to 8, the front of the male nipple 100 is located on the right side of that nipple, while the front of the female element 200 is located on the left side of that element. For an element 100 or 200 of the fluid connector R, the terms "the front" and "the back" refer to orientations turned toward the front face and the rear face, respectively, of that component 100 or 200 of the fluid connector R.

The male nipple 100 is provided with an axial front face 112 oriented toward the female element 200 in the configuration of FIGS. 1 to 8 and which surrounds the inner channel 104. This front face 112 is equipped with a circumferential groove 114 that extends all around the axis X1 and the average diameter of which is noted D114 and the maximum depth P114 is noted relative to the front face 112. The depth P114 is measured parallel to the longitudinal axis X1.

The bottom radius of curvature of the groove 114 is noted as R114.

The female element 200 is centered on a longitudinal axis X2 and comprises a body 202 intended to receive a front portion of the male nipple 100 in a connected configuration of the fluid connector R.

In the following, unless otherwise noted, the adjectives "longitudinal" and "radial," "outer" and "inner," and the adverbs "longitudinally," "axially," and "radially" are used in reference to the longitudinal axis X2. In addition, a surface is said to be "radial" when it extends radially about the longitudinal axis X2, "inner" when it is oriented toward that axis, and "outer" when it is oriented away from that axis. A surface is said to be "axial" when it is perpendicular to the longitudinal axis X2.

Preferably, the body 202 is formed of a one-piece front portion 2022 and a one-piece rear portion 2024 screwed to the front portion 2022, with an O-ring seal 2026 interposed. The parts 2022 and 2024 are made of metal, preferably steel.

The body 202 defines a central fluid flow channel 204 which is connected, on the back of the body 202, to a fluid circulation channel C2, in the example of gas, which is shown in mixed line, only in FIG. 1 for clarity of the drawing.

The female connector member 200 lacks a valve for sealing its inner channel 204.

The female connector element 200 is equipped with a locking mechanism 206 which comprises a row of twenty-four balls 2062 arranged in as many through radial housings 2064 arranged in the body 202, near its front edge 2021. The housings 2064 are through, in the sense that they open both onto an outer radial surface 2023 and onto an inner radial surface 2025 of the body 202, more particularly its front portion 2022. This inner radial surface 2025 radially delimits a volume for receiving the body 102 of the nipple 100 in the configuration of FIGS. 3 to 7.

The diameter of the surface 2025, which is an inner diameter of the body 202, is noted as D1.

Each of the housings 2064 is constricted in the vicinity of the surface 2025 so as to have a diameter strictly less than that of the balls 2062, which limits the centripetal movement of the balls in their housings, in the direction of the longitudinal axis X2.

The balls 2062 are movable, radially to the longitudinal axis X2, in the body 202 between an inner blocking position, in which they protrude from the inner radial surface 2025 into the receiving volume of the male nipple 100 and do not protrude from the outer radial surface 2023, and an outer release position, in which they protrude from the outer radial surface 2023 and do not protrude from the inner radial surface 2025 into the receiving volume of the body 102. The balls 2062 in the inner position are closer to the axis X2 than in the outer position.

A blocking ring 2066 is movably mounted about the body 202, parallel to the longitudinal axis X2, being spring-loaded toward the front edge 2021 by a spring 2068 interposed between the body 202 and the blocking ring 2066. The blocking ring 2066 and the spring 2068 are part of the locking mechanism 206. In particular, the blocking ring 2066 is movably mounted about the front portion 2022.

The spring 2068 exerts a spring force E2 on the blocking ring 2066, which is parallel to the longitudinal axis X2, distributed around this and directed towards the front edge 2021. The blocking ring 2066 is movable, parallel to the longitudinal axis X2, relative to the body 202, between a first position of blocking the balls 2062 in their inner position and a second, retracted position in which the blocking ring does not oppose the movement of the balls toward their outer position. The first position of the blocking ring 2066 is visible in FIGS. 1, 2, and 4 to 8, and corresponds to the unconnected and connected configurations, while its second position is visible in FIG. 3. In the first position, the blocking ring 2066 radially surrounds the locking balls 2062 and holds them in their inner blocking position.

The inner radial surface of the front portion 2022 of the body 102 is stepped, in that it presents a plurality of radial and inner circular surfaces of different diameters.

The inner radial surface 2025 is connected by a fillet 2026 to the axial and front annular surface that defines the front edge 2021, which surrounds an opening 208 of the female element 200.

The housings 2064 open out on their entire periphery onto the inner radial surface 2025, which constitutes a first inner cylindrical surface of the body 202, starting from the opening 208.

A second inner radial surface 2027 is arranged behind the first surface 2025 and delimited on the front by a first axial surface 2028, which is frontal, in that it is oriented towards the front of the female connector element 200. When the balls 2062 are in the inner position, in particular in the unconnected configuration of the connector R, the balls 2062 extend partially, into the receiving volume of the body 102, facing the front axial surface 2028, according to a direction parallel to the longitudinal axis X2.

The diameter of the surface 2027 which is strictly less than the diameter D1 is noted D2, which corresponds to the fact that the front axial surface 2028 has a non-zero radial width.

A third inner radial surface 2029 is arranged behind the second inner radial surface 2027 with a diameter D3 strictly greater than the diameter D2 and preferably less than or equal to the diameter D1.

A frustoconical chamfer 2030 connects the second and third inner radial surfaces 2027 and 2029. This chamfer 2030 diverges toward the rear of the body 202 and is turned toward the rear of the female connector element 200.

A second axial surface 2031, which is frontal, stops at the third inner radial surface 2029 and connects it to an outer radial surface 2032 of an inner radial wall 2033 of the body 202. The inner radial wall 2033 is arranged radially to the longitudinal axis X2 within the axial surface 2031 and axially along the longitudinal axis, in front of this axial and frontal surface. A front axial surface of the inner radial wall 2033 is noted 2034. An inner radial surface of this inner radial wall 2033 is noted 2035. The surface 2035 helps to radially delimit the inner channel 204 of the female connector element 200. The length of the inner radial wall 2033, is noted L203, in other words, the axial distance between the surfaces 2031 and 2034. The diameter of the outer radial surface 2032 is noted D4, this diameter being strictly less than the diameter D2.

The chamfer 2030, the inner radial surface 2029, the axial surface 2031 and the outer radial surface 2032 together define a chamber C202 of the body 202 in which is partially housed a seal 210 intended to cooperate with the nipple 100, more particularly intended to cooperate by contact with the body 102 of the nipple 100. The seal 210 is mounted on the body 202 around the inner channel 204. The surfaces 2030 and 2031 form a distal surface and a proximal surface of chamber C202, respectively. The surfaces 2030, 2029, 2031, and 2032 are integral to the body 202, with no ability to move relative to the body 202. In practice, these surfaces 2030, 2029, 2031 and 2032 are all formed on the front portion 2022 of the body 202, the front portion 2022 of which is one-piece.

The seal 210 is a shaped seal, preferably obtained by molding EPDM (ethylene propylene diene monomer) type elastomer. Alternatively, the seal 210 may be made of MBR (nitrile rubber), FPM (fluorinated rubber) or FFKM (perfluoroelastomer). Preferably the seal 210 has a hardness of 70 Shore A.

The seal 210 is one-piece and rotationally symmetrical about its central axis X10, which is coincident with the longitudinal axis X2 in the mounted configuration of the seal 210 on the body 202 and in the unconnected configuration of the female element 200.

The seal 210 comprises a base 2102 and a single lip 2104. The base 2102 extends radially outward from the lip 2104 relative to the axis X10 and the axis X2 in the mounted configuration of the seal 210 on the body 202. Prior to mounting the seal 210 on the body 202, the base 2102 presents, in cross-section in the plane of FIG. 2, a generally rectangular shape with a radial thickness e2, measured radially to the axis X10.

A peripheral notch 2106 is arranged between the base 2102 and the lip 2104 radially to the axis X10, therefore to the longitudinal axis X2 in the mounted configuration of the seal 210 on the body 202. The notch 2106 opens onto the front of the seal 210. In particular, the peripheral notch 2106 opens onto the front of the seal 210 all around the axis X10. It is blind at the rear, where its bottom 2107 is delimited by a joining portion 2108 between the base 2102 and the lip 2104. The joining portion 2108 is integral with the parts 2102 and 2104 of the seal 210. The length of the joining portion measured parallel to the longitudinal axis X2 is noted as L2108.

The free front end of the lip 2104 is arranged at a front edge 2110 of the lip 2104, which is annular and centered on the axis X10, therefore on the longitudinal axis X2 in the mounted configuration of the seal 210 on the body 202 and in the unconnected configuration of the connector R. This free front edge 2110 is oriented forward, toward the opening 208 and toward the front edge 2021.

An inner radial surface of the lip 2104 is noted 2112. The minimum inner diameter of the seal 210 is noted D5. This minimum inner diameter D5 is defined by the inner radial surface 2112 of the lip 2104. In other words, the minimum inner diameter of the seal 210 is defined by an inner dimension of the lip 2104.

The inner radial surface 2112 partially faces, according to a radial direction, the inner radial wall 2033, more particularly its outer radial surface 2032.

An outer radial surface of the lip 2104 is noted 2116. The notch 2106 is radially delimited, on the side of the lip 2104 by the surface 2116. In addition, the surface 2116 protrudes forward from the notch 2106 and extends to the free front edge 2110.

When the chamber C202 is void of any seal 210, the distal surface 2030 and the proximal surface 2031 of the chamber C202 face each other parallel to the longitudinal axis X2. In the mounted configuration of the seal 210 on the body 202, the base 2102 is arranged partially, axially facing toward the distal surface of the chamber C202, formed by the chamfer 2030, and facing toward the rear, of the proximal surface of that chamber, formed by the surface 2031. The notions of "proximal" and "distal" are defined from the rear face of the body 202, in other words, as seen from the pipe C2. Within the same radial zone defined by the difference in diameters D2 and D3, the seal 210 is axially housed between the proximal and distal surfaces of the chamber C202. This is accomplished with a reduced longitudinal clearance between the seal 210 and the chamber C202, this longitudinal clearance being less than or equal to 5% of the maximum longitudinal dimension measured according to the longitudinal axis X2 between the distal 2030 and proximal 2031 surfaces. This longitudinal clearance may be selected to be less than 0.1 mm. In the example of FIGS. 1 to 8, this longitudinal clearance is zero.

In the state of rest, unmounted, in the body 202, the base 2102 of seal 210 presents outer radial dimensions greater than or equal to the inner radial dimensions of the surfaces 2029 and 2030 of the body 202 that define the chamber C202 radially outward. Thus, in the mounted configuration of the seal 210 where the axes X2 and X10 are coincident, the base 2102 is in outer radial contact, through its outer radial surface 2103, with the chamfer 2030 and with the third inner radial surface 2029. This contact is exclusively radial at the level of the third inner radial surface 2029. Because of the orientation of the chamfer 2030, which is frustoconical and diverging backward, this contact is radial, which limits the movement of the seal 210 relative to the body 202, radially outward. Furthermore, also due to the orientation of the chamfer 2030, this contact is longitudinal, which limits the movement of the seal 210 relative to the body 202 in a forward direction.

As an alternative, not shown, the seal 210 is in outer radial contact only with the chamfer 230 or only with the third inner radial surface 2029.

When the seal 210 is at rest and mounted in the body 202, in other words, in the unconnected configuration of the female element 200, the lip 2104 extends from the joining portion 2108 toward the front of the female connector element 200, parallel to the longitudinal axis X2 and beyond the base 2102. The inner radial surface 2112 and outer radial surface 2116 are cylindrical surfaces with a circular cross-section.

The forward frontal axial surface, of base 2102 is noted 2114. The axial surface 2114 delimits the front end of the peripheral notch 2106. The lip 2104 protrudes forward from the base 2102 for a length L'210 measured parallel to the longitudinal axis X2 between the front edge 2110 of the lip 2104 and the axial surface 2114. The length L'210 is the maximum length of the lip 2104 that protrudes from the notch 2106. The length L'210 is non-zero.

The lip 2104 protrudes forward, relative to a portion of the body 202 that defines the inner radial surface 2027, for a length L"210 measured parallel to the longitudinal axis X2 between the front edge 2110 and the front axial surface 2028 that delimits the inner radial surface 2027 at the front. The length L"210 is the maximum length of the lip 2104 that protrudes from the front axial surface 2028. The length L"210 is non-zero.

The length L"210 is chosen to be strictly greater than the depth P114, preferably greater than or equal to 1.5 times this depth.

The free length L2104 of the lip 2104 is defined as the distance, measured parallel to the longitudinal axis X2 or the axis X10, between the front edge 2110 and the bottom 2107 of the notch 2106 delimited by the joining portion 2108 in the unconnected configuration of the connector element 200. The free length L2104 is therefore the maximum length of the lip 2104 that extends forward from the bottom 2107 of the notch 2106. The ratio L2104/L210 between the free length L2104 and a maximum length L210 of the seal 210, measured parallel to the longitudinal axis X2 or the axis X10, is greater than or equal to 0.7. In this embodiment, this ratio is equal to about 0.8.

The radial thickness of the lip 2104 measured radially to the axis X10 is noted as e4. The radial thickness e4 of the lip 2104 is much less than the free length L2104 of the lip 2104, for example at least 2 times less than the free length L2104, preferably at least 2.5 times less than the free length L2104, such that the lip 2104 extends substantially parallel to the longitudinal axis X2 in the cross-sectional plane of the figures.

The radial thickness e4 is substantially constant over at least 70% of the free length L2104 of the lip 2104 in the sense that the radial thickness e4 varies by less than 15%, preferably less than 10%, over at least 70% of the free length L2104. In particular, the radial thickness e4 of the lip 2104 behind the free front edge 2110, in other words, between the bottom 2107 of the notch 2106 and the rear end of the free front edge 2110, is substantially constant. Furthermore, the radial thickness e2 is strictly greater than the radial thickness e4 at the notch 2106.

Figure 2:
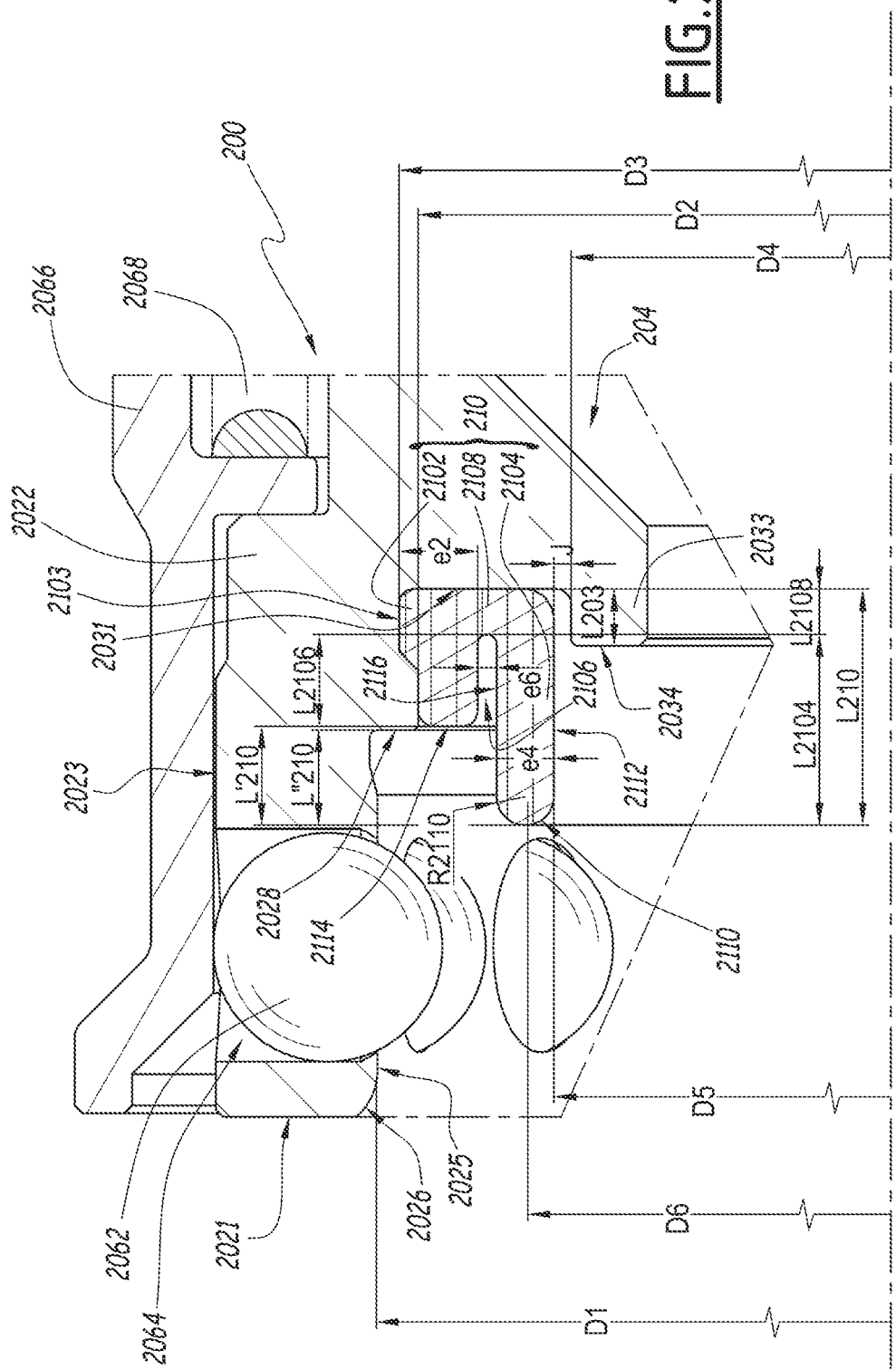
FIG. 2 is a larger scale view of Detail II in FIG. 1.

At its front edge 2110, the lip 2104 presents, in cross-section in the plane of FIG. 2, a convex shape, with its convexity facing forward, more particularly a convex half torus shape with a radius of curvature R2110 that connects the inner radial surface 2112 and the outer radial surface 2116. The radius of curvature R2110 is strictly less, preferably at least 1.5 times less, than the radius of curvature R114.

Thus, the radial thickness of the lip 2104 at the longitudinal level of the free front edge 2110 is less than the radial thickness of the lip 2104 behind the free front edge 2110. The radial thickness e4 behind the free front edge 2110 is equal to twice the radius of curvature R2110 of the free front edge 2110.

The seal 210 is configured to press backward against the proximal surface 2031 of the chamber C202 with its rear surface 2118. A portion of the rear surface 2118, noted as 2118A, is in longitudinal alignment with the lip 2104, in other words, aligned with the lip 2014 according to a direction parallel to the axis X2 in the unconnected configuration of the female connector element 200. This portion of the surface 2118A is, in particular, in longitudinal alignment with the front edge 2110. In its rear position pressed against the proximal surface 2031, the seal 210 is, in particular, pressed against this surface by the portion of the surface 2118A. The maximum length L210 of the seal 210 is measured parallel to the longitudinal axis X2 or axis X10, between the rear surface 2118 and the front edge 2110 in the unconnected configuration. In this position, the lip 2104 protrudes forward from the front axial surface 2028 by the length L"210, relative to the front axial surface 2034 by a non-zero length equal to the difference between the lengths L210 and L203, and relative to the front axial surface 2114 of the base 2102 by the length L'210.

As seen in particular in FIG. 2, in which the seal 210 is pressed backward against the proximal surface 2031, the forward frontal axial surface 2114 is slightly recessed relative to the front axial surface 2028. This is why, the length L'210 is strictly greater than the length L"210. By slightly recessed, it is meant that the forward frontal axial surface 2114 is recessed less than 0.5 mm relative to the front axial surface 2028.

Alternatively, not shown, the surfaces 2028 and 2114 may be flush. In this case, the lengths L'210 and L"210 are equal.

The length of the notch 2106, measured parallel to the coincident axes X2 and X10, in the unconnected configuration of the connector element 200, is noted L2106. The length L2106 is the maximum length of the notch 2106 and is measured parallel to the longitudinal axis X2 between the bottom 2107 of the notch 2106 and the front axial surface 2114 of the base 2102. The ratio L2106/L2104 is between 0.4 and 0.6, preferably equal to about 0.5. Thus, the base 2102 extends forward relative to the joining portion 2108, up to the surface 2114, for a length that is equal to within 10%, to half the free length L2104.

We have the following relationship: L2104=L2106+L'210

The notch 2106 constitutes a free volume for the deformation of the lip during connecting and in the connected configuration.

The radial thickness of the notch 2106, which is substantially constant along its length L2106 in the unconnected configuration of the female element, is noted e6. In this configuration, at the same level along the longitudinal axis X2, the ratio e6/e4 is between 0.25 and 0.4, preferably equal to about 0.33. In practice, the thickness e6 is chosen to be less than or equal to 1 mm, preferably less than or equal to 0.5 mm.

At rest, in other words, in the unconnected configuration of the female connector element 200, a radial clearance J of non-zero thickness exists, between the inner radial surface 2112 of the lip 2104 and the outer radial surface 2032 of the inner radial wall 2033. This results from the fact that the diameter D5 is strictly greater than the diameter D4. The thickness of this radial clearance, that is, half the difference between diameters D5 and D4, is chosen to be less than or equal to 0.5 mm. This radial clearance constitutes a free volume for the deformation of the lip 2104 during connecting and in the connected configuration.

In the unconnected configuration of the female connector element 200, the lip 2104 extends at a distance from the inner radial surface 2025 that is greater than the maximum dimension over which the locking balls 2062 project radially inward, into the receiving volume of the body 102, when they are in their inner position of blocking the nipple 100. In particular, the lip 2104 extends into a volume located, radially to the longitudinal axis X2, inside the front axial surface 2028.

The average diameter of the lip 2104, in other words, a diameter taken halfway between the inner radial surface 2112 and the outer radial surface 2116, is noted D6. The seal 210 may be configured such that the relationship: $2.4 \text{ mm} \leq D1-D6 \leq 3.9 \text{ mm}$. In particular, the average diameter D6 is equal to the average diameter D114 of the circumferential groove 114 of the nipple 100, within 10%.

The inner radial surface 2112 of the lip 2104 is connected by a filet to the rear surface 2118. Thus, in the unconnected configuration, at a level located, radially to the longitudinal axis X2, between the inner radial surface 2112 and the outer radial surface 2116 of the lip 2104, the seal 210 extends continuously from the portion of the surface 2118A to the free front edge 2110. In particular, the seal 210 extends continuously from the surface portion 2118A to the free front edge 2110 at the radial level of the mean diameter D6.

The ratio L203/L210 is between 0.1 and 0.3 preferably between 0.15 and 0.25.

The length L203 is less than or equal to the sum of the lengths L2106 and L2108. Thus, the inner radial wall 2033 extends forward relative to the proximal wall 2031 to the level of, or recessed from, the front end of the notch 2106. In particular, the inner radial wall 2033 extends forward relative to the proximal wall 2031 to the level of, or recessed from, the bottom 2107 of the notch 2106.

Figure 3:
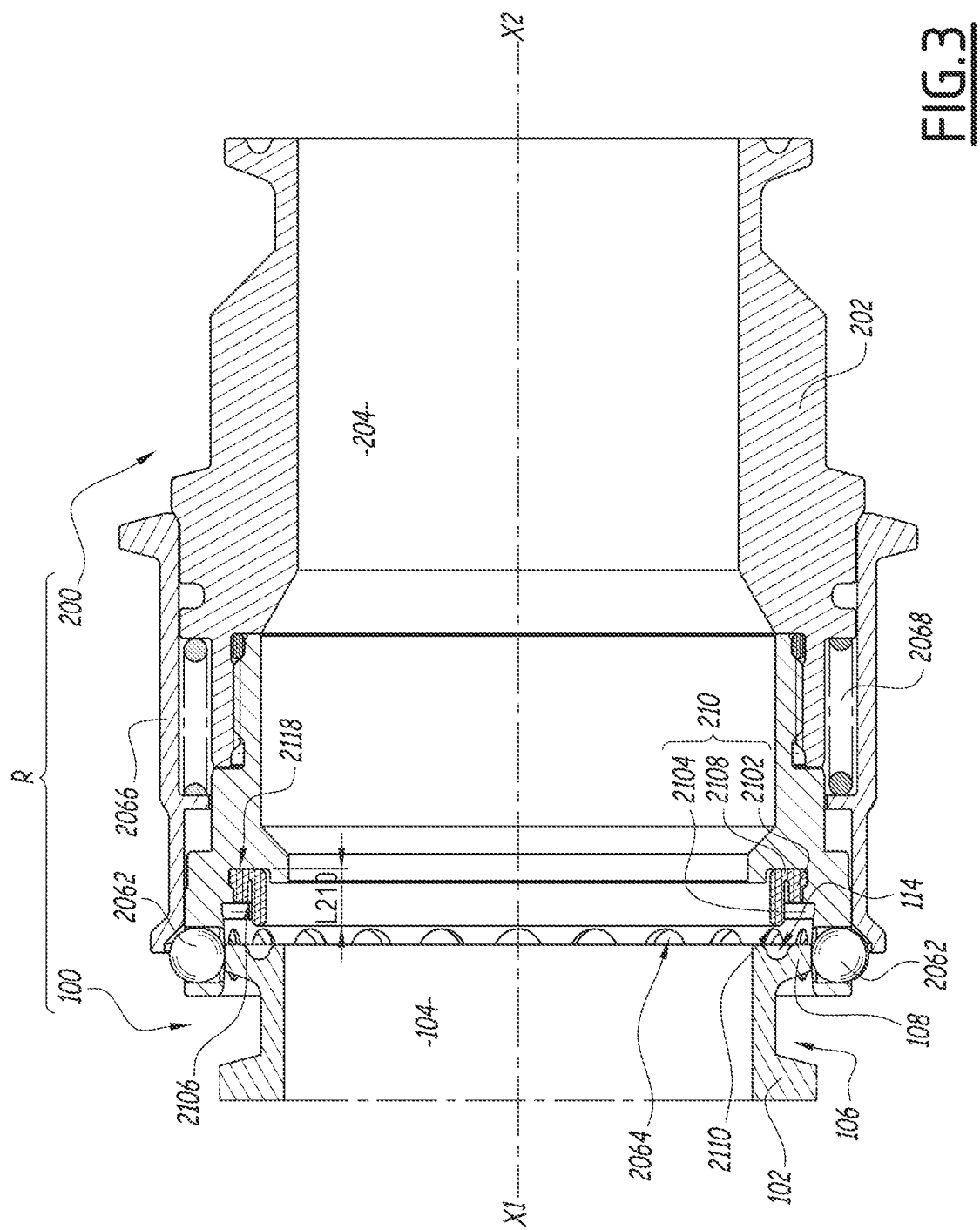
FIG. 3 is a cross-section similar to FIG. 1 in the process of connecting the male and female elements of the fluid connector

Upon connecting, the blocking ring 2066 is manipulated by the operator against the elastic force E2 exerted by the spring 2068 to be moved into its second, retracted position. The bodies 102 and 202 are arranged facing each other, aligning the axes X1 and X2. The body 102 of the nipple 100 is introduced into the receiving volume of the female connector element 200, through the opening 208, and radially pushes the balls 2062 into their outer position, as shown in FIG. 3. The body 102 comes into contact with the lip 2104 at the level of the free front edge 2110, which constitutes the front edge of the seal 210.

This movement continues until the groove 106 is aligned, along the longitudinal axis X2, with the balls 2062. The operator can then release the ring 2066 which is pushed, by the elastic force E2 exerted by the spring 2068, into a configuration where it blocks the balls 2062 in the engaged configuration in the groove 106, in other words, in their inner position.

Figure 4:
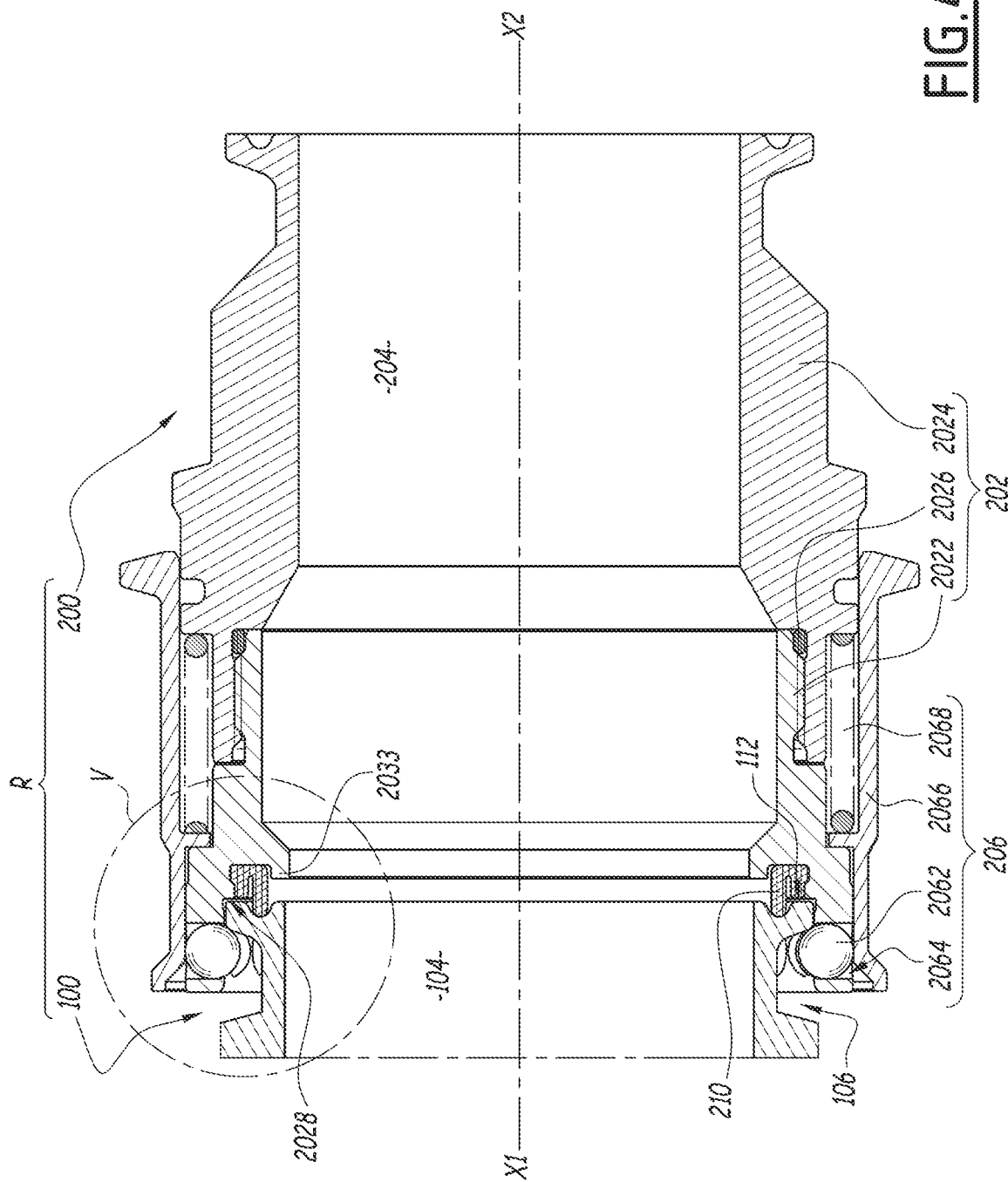
FIG. 4 is a cross-section similar to FIG. 1 in the connected configuration of the male and female elements of the fluid connector
Figure 5:
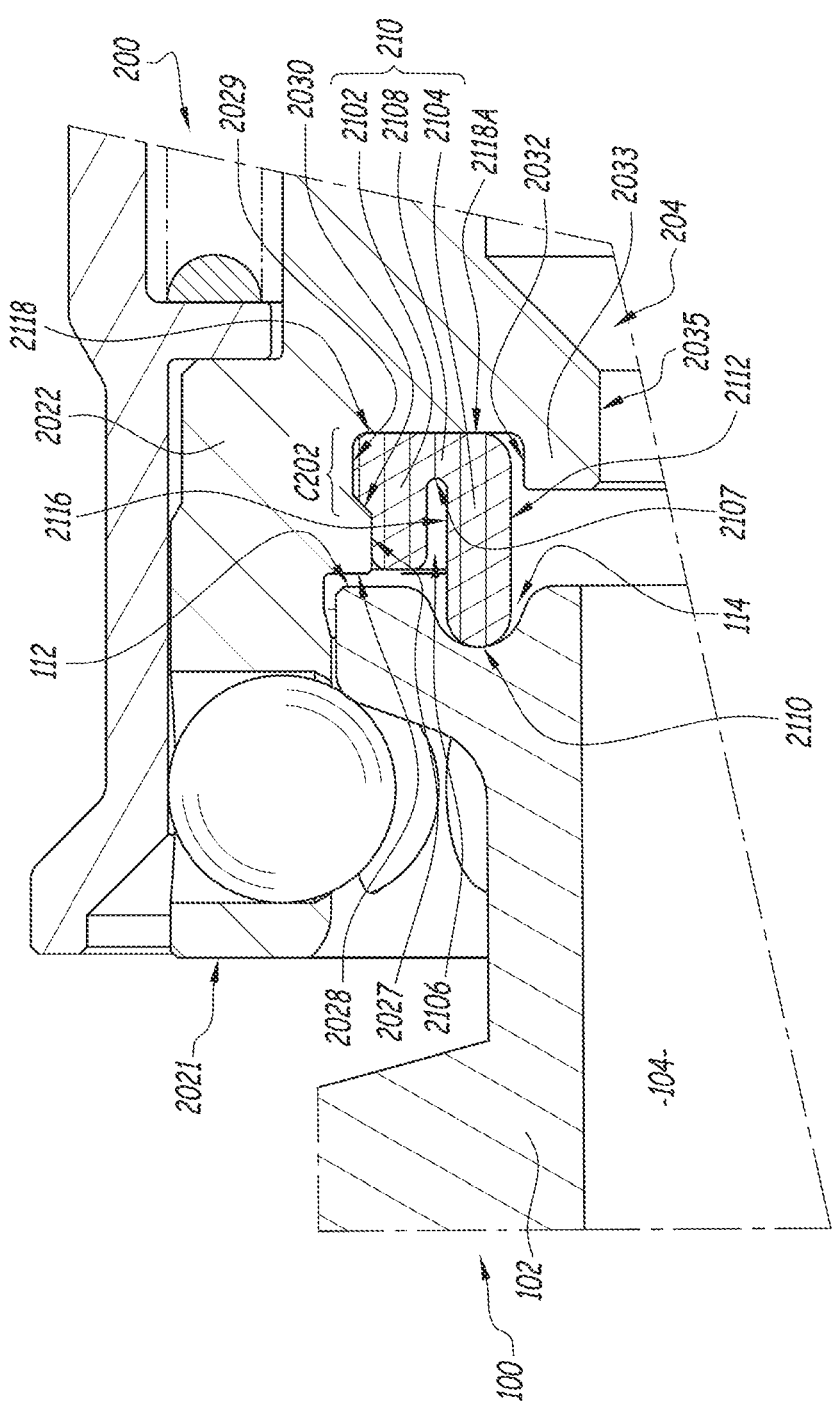
FIG. 5 is a larger scale view of detail V of FIG. 4.

In this configuration, the elements 100 and 200 of the connector are connected, as shown in FIGS. 4 and 5.

During connecting, the lip 2104 of the seal 210, which is aligned with the circumferential groove 114 according to a direction parallel to the longitudinal axis X2, penetrates this groove and comes into contact with the bottom of this groove. This follows in particular from the value of the ratio between the distance L"210 and the depth P114. Thus, the lip 2104 is engaged in, and in contact with, the circumferential groove 114, with the free front edge 2110 in contact with a surface of the body 102 delimiting the circumferential groove 114, more precisely with the bottom of the circumferential groove 114. The seal 210 is in rear contact with the proximal surface 2031 at least at the level of the surface portion 2118A. Thus, insertion of the body 102 of the nipple 100 into the body 202 of the female connector element 200 has the effect of longitudinally compressing the seal 210, at the level of the lip 2104, between the body 102 and the proximal surface 2031 of the chamber C202, thereby ensuring a seal between the bodies 102 and 202, while the inner channels 104 and 204 communicate to allow fluid flow through the fluid connector R.

The configuration of the lip 2104 in FIGS. 4 and 5 corresponds, for example, to a configuration where equivalent pressures are exerted on both sides of the seal 210.

Because the radius of curvature R2110 is strictly less than the radius of curvature R114, clear contact is made between the free front edge 2110 and the bottom of the circumferential groove 114.

During connecting of the male and female elements and in the connected configuration, the lip 2104 deforms elastically under the uniaxial compressive forces exerted on the seal 210 by the bodies 102 and 202, possibly by buckling according to an aspect of the invention not shown in FIGS. 4 and 5, and tends to push the body 102 out of the body 202, whereas, in the connected configuration, the locking balls 2062 oppose a withdrawal movement of the body 102 relative to the body 202. In other words, in the connected configuration, the locking balls block the nipple 100 inside the body 202, against a force exerted by the elastically deformed lip 2104 in this configuration.

In the connected configuration shown in FIGS. 4 and 5, over its entire periphery, the front face 112 of the body 102 is not in contact with the front axial surface 2028. More specifically, an annular portion of the front face 112, which radially surrounds the groove 114, is longitudinally facing the front axial surface 2028 and spaced from this front axial surface, with no contact between the front face 112 and the front axial surface 2028. In this position, the body 102 also does not contact the inner radial wall 2033, which is substantially recessed from the front edge 2110.

Figure 6:
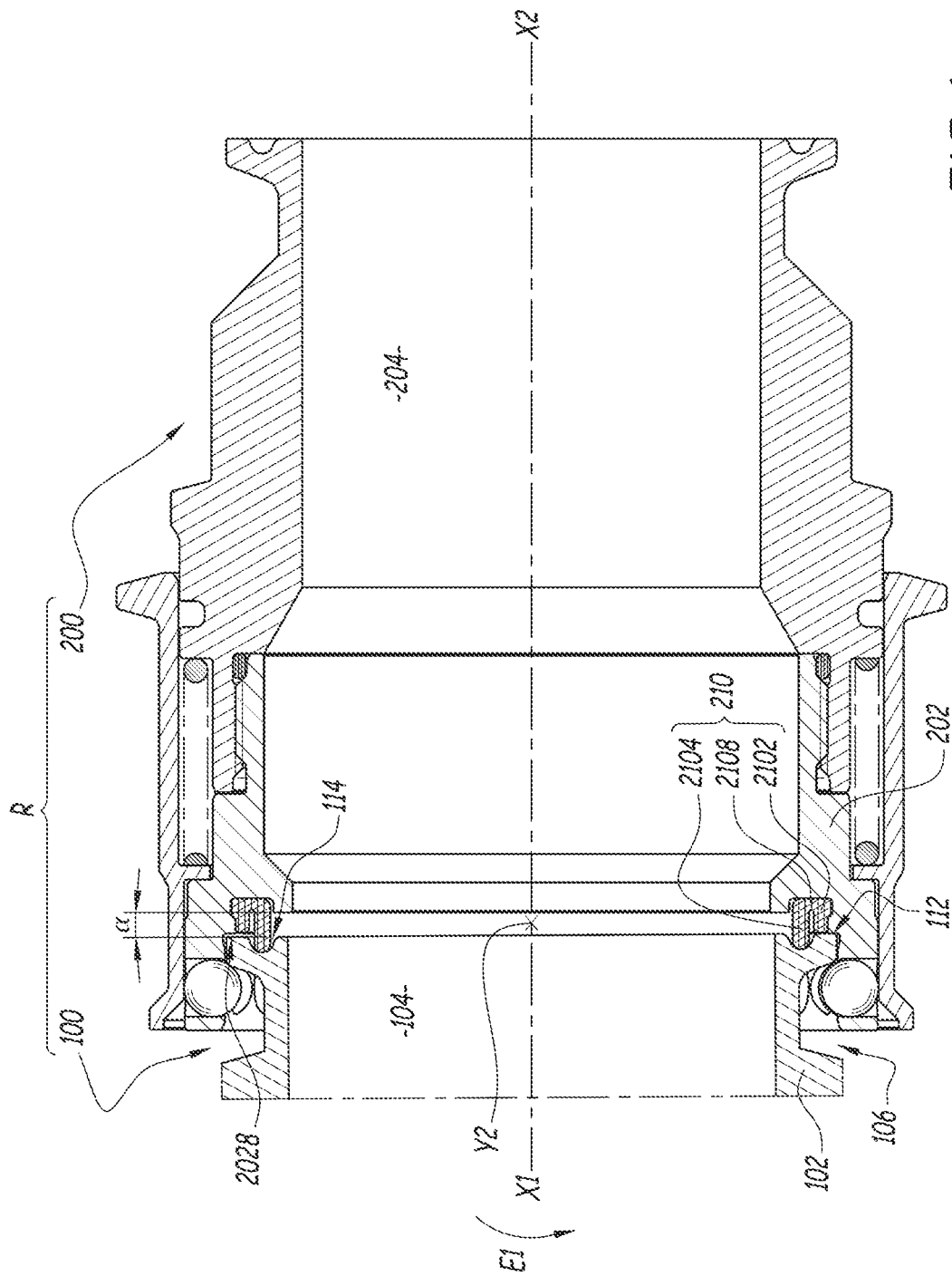
FIG. 6 is a cross-section similar to FIG. 4, in the connected configuration, in case of tilting of one of the elements of the fluid connector relative to the other.

If, from the connected configuration of FIGS. 4 and 5, the body 102 of the nipple 100 is subjected to a pivoting force about an axis Y2 perpendicular to the axes X1 and X2, as represented by the arrow E1 in FIG. 6, relative tilting of the bodies 102 and 202 may occur due to the clearance existing between the balls 2062 and the groove 106. The tilt angle α is limited by localized contact of the front face 112 of the body 102 with the front axial surface 2028, as shown in the lower part of FIG. 6. Even in this position, the body 102 does not contact the inner radial wall 2033.

In this tilted connected configuration, the portion of the lip 2104 shown in the lower part of FIG. 6 is more compressed than the portion of that lip shown in the upper part of that Figure.

The seal 210 is configured to accommodate such variations in the forces the lip 2104 is subjected to, while remaining in contact with the bodies 202 and the body 102 all around the axis X2.

Tilting is limited by the fact that the front face 112 comes in contact locally with the front axial surface 2028, which limits the maximum value of the tilt angle α and reduces the stress on the seal 210 during tilting.

Figure 7:
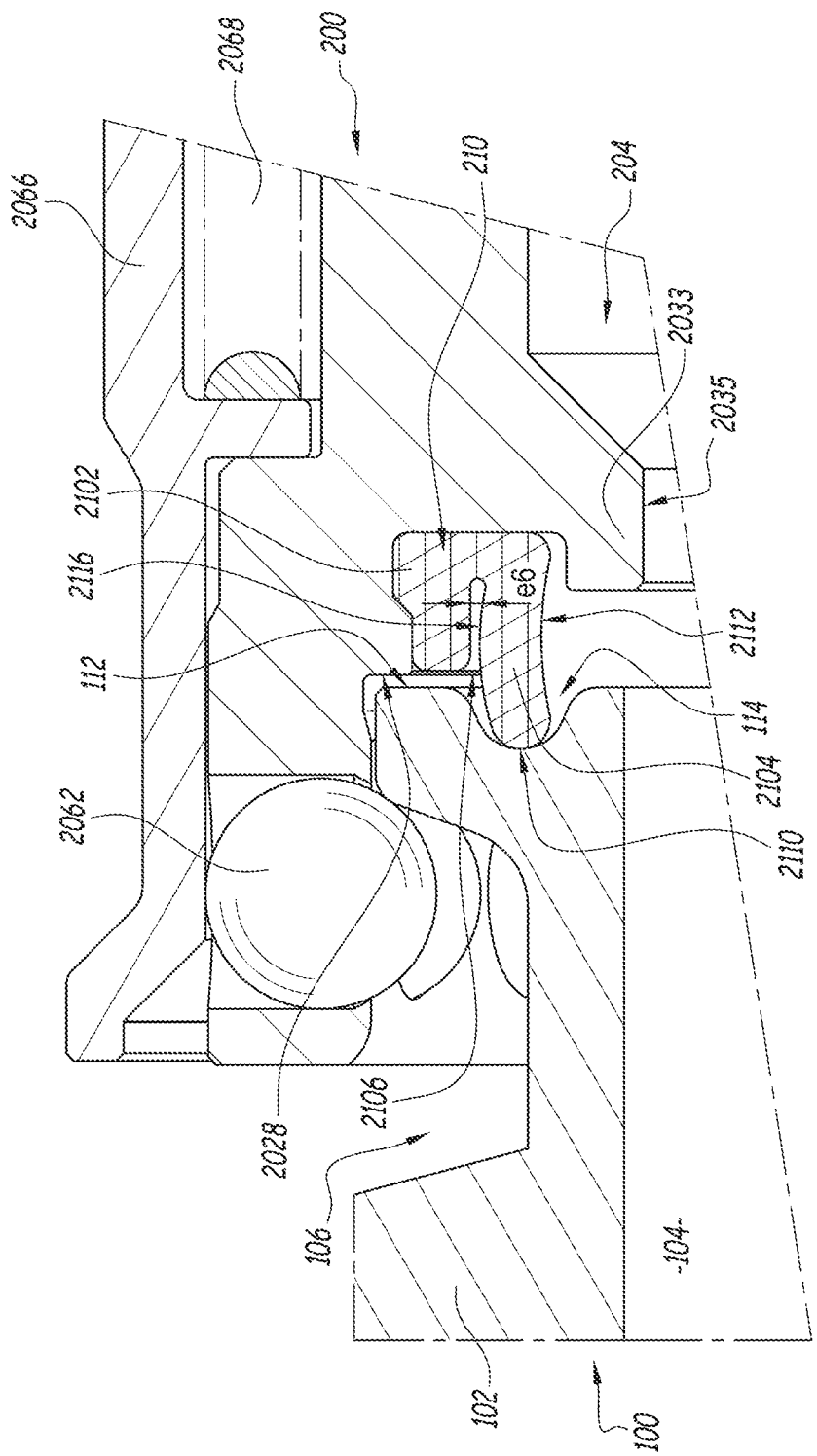
FIG. 7 is a view similar to FIG. 5, when a first pressure difference applies between the outside and the inside of the fluid connector.

On the other hand, as shown in FIG. 7, when a fluid with a pressure greater than the pressure prevailing outside the connector R passes through the inner channels 104 and 204 in the connected configuration, the greatest pressure is applied to the inner radial surface 2112 of the lip 2104, which tends to press the lip, particularly the front edge 2110, against a radial outer edge of the groove 114 and to deform the lip 2104 radially outward, relative to a configuration where the pressures are equivalent on both sides of the seal 210, in other words, between the outside and inside of the connector. This gives the inner radial surface 2112 of the lip 2104 a domed shape, with its concavity turned toward the longitudinal axis X2. The thickness e6 of the notch 2106 decreases locally and the outer radial surface 2116 approaches the base 2102 locally, relative to the unconnected configuration of the female element 200.

Figure 8:
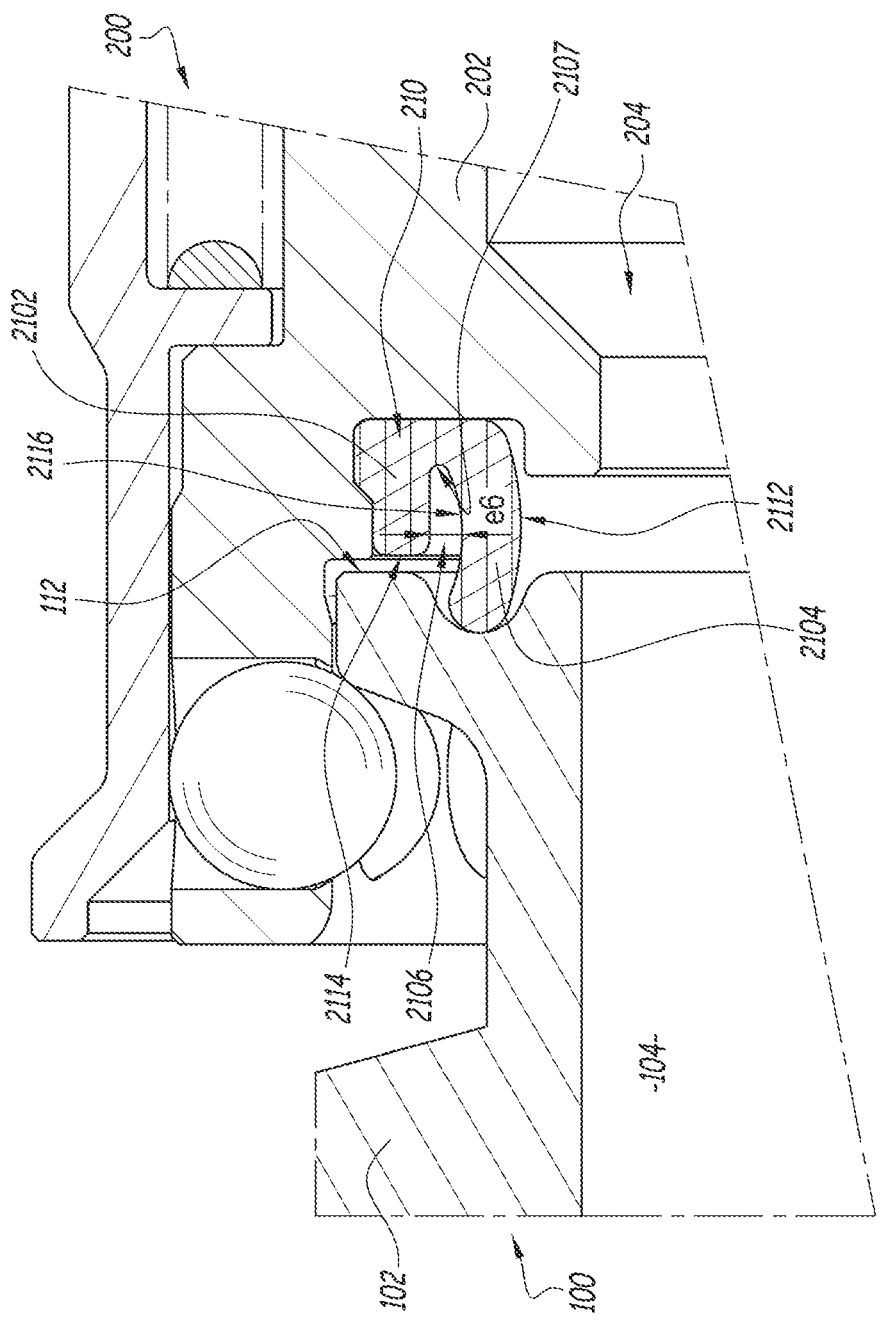
FIG. 8 is a view similar to FIG. 5, when a second pressure difference applies between the outside and inside of the fluid connector.

Conversely, and as shown in FIG. 8, when the pressure of the fluid passing through the inner channels 104 and 204 in the connected configuration is less than the pressure prevailing outside, the highest pressure is applied to the outer radial surface 2116 of the lip 2104, which tends to press the lip, particularly the front edge 2110, against an inner radial edge of the groove 114 and to deform the lip 2104 radially inward, relative to a configuration where the pressures are equivalent on both sides of the seal 210, in other words, between the outside and inside of the connector. The inner radial surface 2112 of the lip 2104 then adopts a domed configuration with its concavity turned away from the longitudinal axis X2. The thickness e6 of the notch 2106 increases locally and the outer radial surface 2116 moves locally away from the base 2102, relative to the uncoupled configuration of the female element 200.

The convex, rounded shape of the free front edge 2110 allows for optimal adaptation of the seal 210 to variations in the geometry of the circumferential groove 114, the tilting of the body 102 in the body 202 in the connected configuration, and the pressure differentials on either side of the seal 210 in the connected configuration.

To disconnect the male and female elements of the connector, the operator slides the ring 2066 along the body 202 until it reaches its second position, which releases the balls 2062, which can then move toward their outer position to clear the passage for the body 102 of the nipple 100 out of the body 202 of the female connector element 200.

Figure 9:
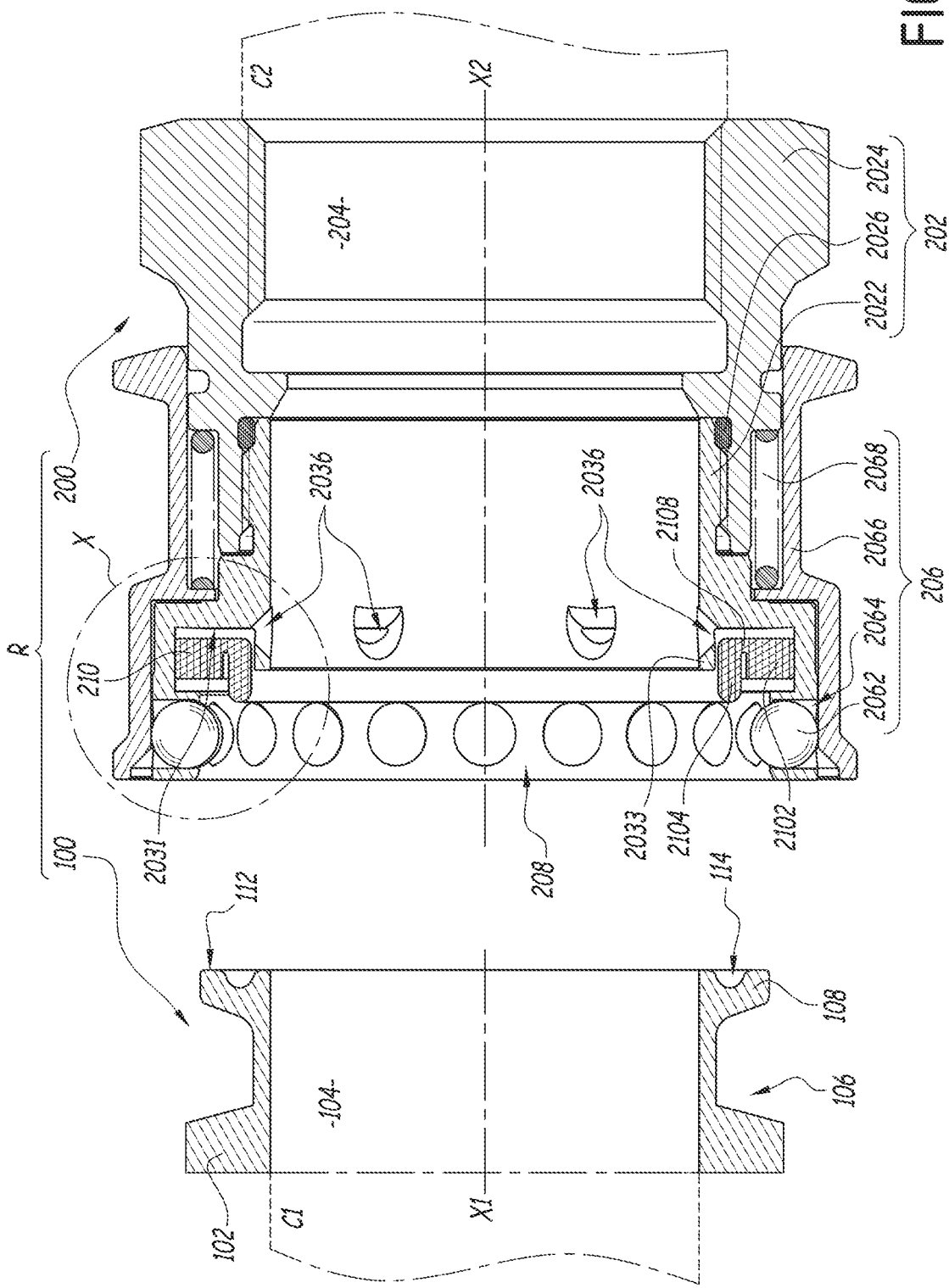
FIG. 9 is a cross-section similar to FIG. 1 for a fluid connector according to a second embodiment of the invention.
Figure 10:
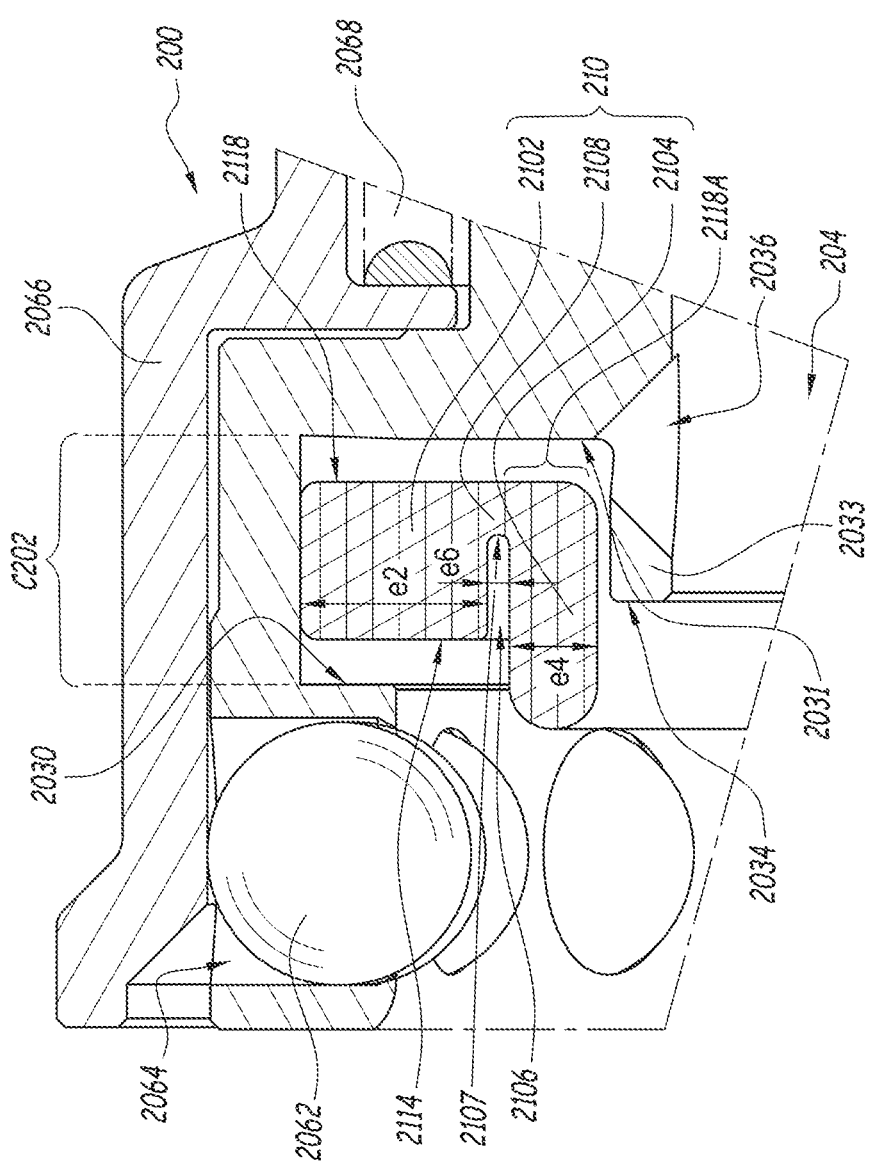
FIG. 10 is a larger scale view of detail X in FIG. 9.
Figure 11:
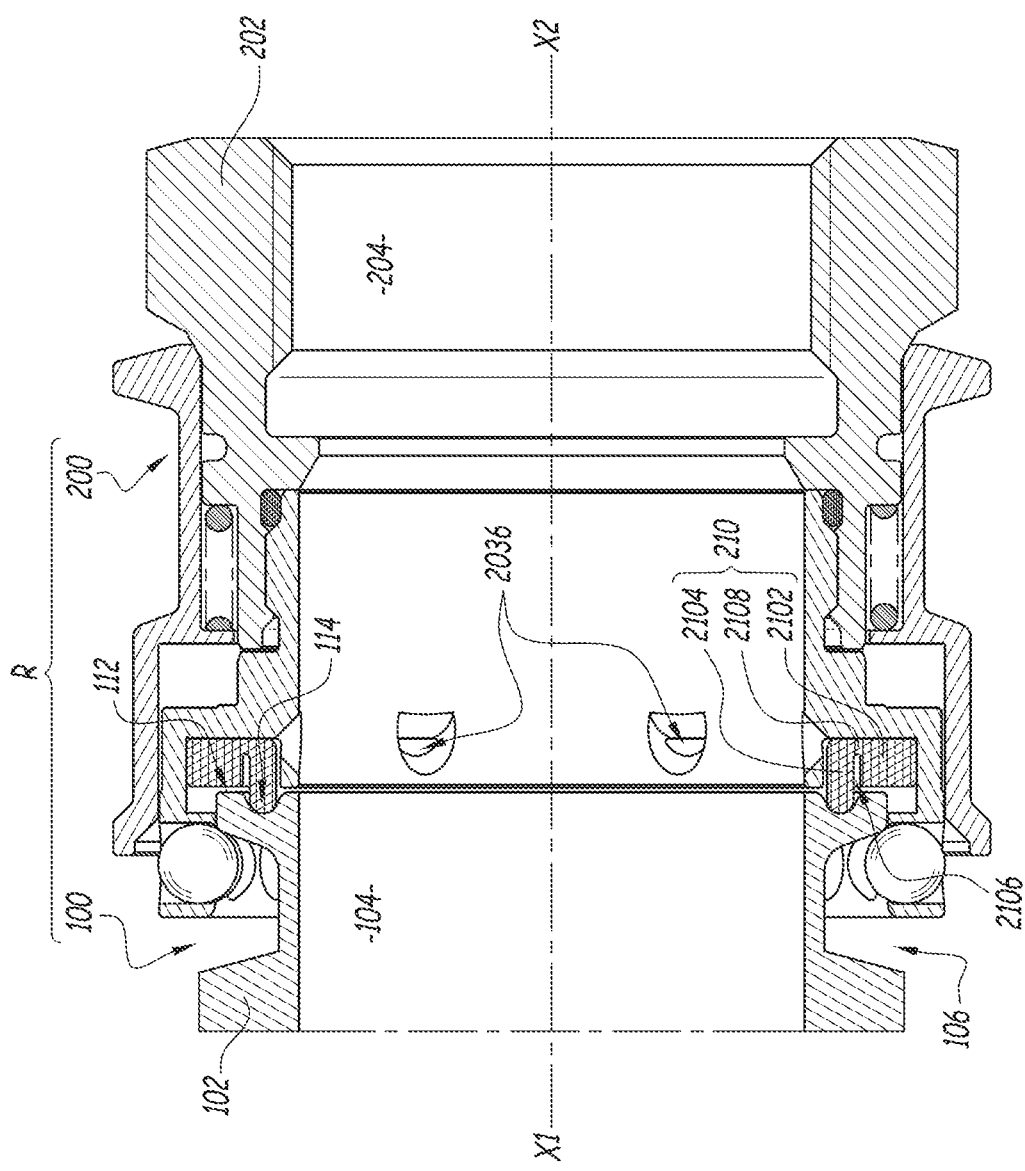
FIG. 11 is a longitudinal cross-section, similar to FIG. 4, showing the fluid connector of FIGS. 9 and 10 in a connected configuration.

In the second embodiment shown in FIGS. 9 to 11, the elements similar to those in the first embodiment have the same references. If a reference is mentioned hereinafter without being visible in FIGS. 9 to 11, or if a reference is used in any of FIGS. 9 to 11 without being mentioned in the description, it corresponds to the object bearing the same reference in the first embodiment. In the following, it is mainly that which distinguishes this embodiment from the previous one that is written.

Here, the chamber C202 is defined axially between a distal surface 2030 and a proximal surface 2031 that are both axial.

In this embodiment, there is no axial front surface comparable to the axial front surface 2028 of the first embodiment.

Furthermore, the chamber C202 is delimited radially inward by the inner radial wall 2033 the front axial surface 2034 of which, is intended to receive in support the front face 112 of the male nipple, more precisely the annular part of the front face 112 which is surrounded radially by the circumferential groove 114, in the event of tilting according to a movement comparable to the one represented by the arrow E1 in FIG. 8, for the first embodiment.

Here, the inner radial wall 2033 is provided with a plurality of passages 2036 for fluid passing through the inner channel 204 of the female connector element 200.

As in the first embodiment, the seal 210 comprises a base 2102 and a lip 2104 separated by a notch 2106, the bottom 2107 of which is delimited by a joining portion 2108 connecting the base 2102 and the lip 2104. The base 2102 is not mounted with reduced longitudinal clearance between the distal surface 2030 and the proximal surface 2031 and may be in a configuration axially offset from both the distal surface 2030 and the proximal surface 2031 when the female connector element 200 is in an unconnected configuration, as shown in FIGS. 9 and 10. In this position, the rear surface 2118 of the seal 210 is axially offset toward the front relative to the proximal surface 2031, while the forward, frontal axial surface 2114 of the base 2102 is axially offset toward the rear relative to the distal surface 2030. At the beginning of the connecting movement, the seal 210 is pushed back until it comes to press backward with its surface 2118 against the proximal surface 2031 of the chamber C202, more particularly in contact with a portion 2118A of the surface 2118 aligned longitudinally with the lip 2104, therefore in particular with a front edge 2110 of the lip 2104.

This position of the seal 210 in the chamber C202, which is also valid in the connected configuration of the fluid connector R, is visible in FIG. 11.

In an alternative, applicable to both embodiments shown in the figures, the body 202 may be devoid of an inner radial wall, in which case the proximal surface 2031 of the chamber C202 extends to the inner channel 204.

According to another embodiment, also not shown, locking members other than the balls may be used, in particular fingers or segments, such as those described in EP-A-1 531 297. Such locking members are movable relative to the body 202 radially to the axis X2 to the extent that they are further from the axis X2 in the outer position rather than in the inner position.

The number of locking members may be different from 24, while remaining greater than or equal to 2.

According to yet another embodiment of the invention, not shown, the front face 112 of the male nipple 100 may be stepped, with an annular portion surrounding the circumferential groove 114 that is located further forward of the body 102 than an annular portion located between the circumferential groove and the opening of the inner channel 104. Such a geometry is known, for example, from EP-A-3 220 034. In this case, the circumferential groove 114 is not symmetrical and the longitudinal depth of the groove to be considered is the depth of the side of the annular portion of the front face 112 that radially surrounds the circumferential groove 114.

According to one embodiment of the invention, not shown, the lip 2104 may be arranged radially outward of the base 2102.

According to an alternative of the invention, not shown, a minimum inner diameter of the seal may not be defined by an inner dimension of the lip, but by an inner dimension of an additional base of the seal, integral with the base 2102, which is arranged radially inside of the base 2102, the lip 2104, and the joining portion 2108. Preferably the length of this additional base is less than the length L2108 of the joining portion 2108.

In an alternative, not shown, the fluid connector of the invention is configured to connect two pipes.

Regardless of the embodiment, the seal 210 presses against the proximal surface 2031 of the body 202 of the female connector element 200 with its rear surface 2118. In particular, contact between the seal 210 and the body 202 occurs at the level of the portion 2118A of the rear surface 2118, therefore on the rear and in alignment with the front edge 2110, and contact between the seal 210 and the body 102 occurs, in particular, at the level of the circumferential groove 114, therefore on the front and in alignment with the front edge 2110, thereby compressing the lip 2104 arranged longitudinally between the surface portion 2188A and the free front edge 2110. This ensures an effective sealing arrangement between the seal and the body upon connecting of the fluid connector elements 100 and 200, this sealing arrangement being equally suitable for the case of an outer pressure greater than the pressure within the connector as for the case of an outer pressure less than the pressure within the connector. The base 2102 of the seal, which is more massive than the lip 2104 due to the fact that the radial thickness e2 is greater than the radial thickness e4, allows for precise positioning of the lip 2104 with respect to the body 202 of the female connector element 200, as well as with respect to the complementary nipple 100, especially its circumferential groove 114. The construction of the seal 210, with a base 2102, a lip 2104, and a peripheral notch 2106, allows for relatively easy deformation of the lip during connection of the fluid connector elements and in the connected configuration, by widening or narrowing of the peripheral notch 2106 and/or by deformation of the lip in the volume corresponding to the radial clearance J. As a result, the force required to connect the elements of the fluid connector R is reduced relative to the case where the lip 2104 would be set in a tight housing. Deformation of the lip 2104 in the connected configuration is still possible under the effect of pressure exerted on either side of the seal, in other words, between the outside and inside of the connector, or under the effect of relative tilting of the bodies 102 and 202 of the elements 100 and 200 of the fluid connector R. The construction of the seal 210 with a base, a lip, and a notch also allows the lip 2104 to have a relatively large free length L2104, which facilitates its deformation, without excessively increasing the longitudinal bulk of the seal, in particular its maximum length L210. Since the base 2102 extends, forward relative to the joining portion 2108, for a length L2106 equal to about half of the free length L2104 of the lip 2104, the base forms an obstacle to too much outer radial deformation of the seal 210, in particular to a radial deformation that would be greater than the radial thickness e6 of the peripheral notch 2106, during connecting or in the connected configuration of the fluid connector R. Furthermore, the inner radial wall 2033 forms an obstacle to too much inner radial deformation of the seal 210, during connecting or in the connected configuration of the fluid connector R.

The embodiments and alternatives contemplated above may be combined to generate new embodiments of the invention.

The invention claimed is:

1. A female element for a connector, able to be connected with a complementary nipple for joining two pipes, the female connector element comprising
   a body for receiving the nipple, this body being centered on a longitudinal axis and delimiting, within the body, an inner fluid circulation channel which extends between a front face of the female element, oriented towards the nipple during a press-fitting of the female element and the nipple, and a rear face of the female element, oriented towards a pipe to which this female element is connected;
   a locking mechanism comprising
      a plurality of locking members, movable relative to the body, radial to the longitudinal axis, between an inner position of blocking the nipple in the body and an outer position of releasing the passage of the nipple in the body
      a blocking ring mounted around the body and movable between a first position of blocking the locking members in their inner position and a second position in which the blocking ring does not prevent movement of the locking members to their outer position; and
   a seal configured to cooperate with the nipple, this seal being housed in the body, around the inner channel, and comprising
      a base arranged facing backward to a proximal surface of the body and facing, forward to a distal surface of the body, and
      a lip,
   wherein
      the lip extends parallel to the longitudinal axis and forward, protruding from the base and presenting a free front edge;
      the seal presents a peripheral notch which is arranged radially to the longitudinal axis between the base and the lip, which opens onto the front of the seal and a bottom of which is delimited on the back by a connecting portion of the seal connecting the base and the lip;
      the seal is configured to come in contact backward against the proximal surface, in alignment with the free front edge of the lip, according to a direction parallel to the longitudinal axis; and
      the peripheral notch constitutes a free volume for deformation of the lip during connecting and in a connected configuration of the female element with the nipple.

2. The female connector element according to claim 1, wherein, in an unconnected configuration of the female connector element, a ratio between,
   a length of the peripheral notch measured parallel to the longitudinal axis and
   a free length of the lip measured parallel to the longitudinal axis between the bottom of the peripheral notch and the free front edge of the lip, is between 0.4 and 0.6.

3. The female connector element according to claim 2, wherein the ratio is equal to about 0.5.

4. The female connector element according to claim 1, wherein, in an unconnected configuration of the female connector element, a ratio between
   a free length of the lip measured parallel to the longitudinal axis between the bottom of the peripheral notch and the free front edge of the lip and
   a maximum length of the seal, measured parallel to the longitudinal axis, is greater than or equal to 0.7.

5. The female connector element according to claim 1, wherein, in an unconnected configuration of the female connector element, the free front edge of the lip presents a convex shape.

6. The female connector element according to claim 1, wherein, in an unconnected configuration of the female connector element, at a same radial level, the seal extends continuously from the free front edge to a rear surface of the seal configured to come in contact backward against the proximal surface.

7. The female connector element according to claim 1, wherein, in an unconnected configuration of the female connector element, the lip presents, behind the free front edge, a radial thickness that is constant.

8. The female connector element according to claim 1, wherein, in an unconnected configuration of the female connector element, a ratio between
   a radial thickness of the peripheral notch and
   a radial thickness of the lip, at a same level along the longitudinal axis is less than or equal to 0.4.

9. The female connector element according to claim 1, wherein, in an unconnected configuration of the female connector element, the base presents, at the peripheral notch, a radial thickness strictly greater than a radial thickness of the lip.

10. The female connector element according to claim 1, wherein, in an unconnected configuration of the female connector element,
when the locking members are in their inner position, the locking members extend partially into a receiving volume of the body and face, in a direction parallel to the longitudinal axis a front axial surface of the body;
the lip extends in a volume located, radially to the longitudinal axis, toward the longitudinal axis with regard to the front axial surface; and
the lip protrudes forward, relative to the front axial surface, for a non-zero length.

11. The female connector element according to claim 1, wherein
the body comprises an inner radial wall which is arranged, radially closer to the longitudinal axis than, inside the proximal surface, and which is arranged, axially along the longitudinal axis, forward with regard to the proximal surface;
in an unconnected configuration of the female connector element, a radial inner surface of the lip faces, radially to the longitudinal axis, the radial inner wall, and a radial clearance of a non-zero thickness exists, between the inner radial surface of the lip and an outer radial surface of the radial inner wall.

12. The female connector element according to claim 1, wherein the base of the seal is mounted, according to a direction parallel to the longitudinal axis, between the proximal surface and the distal surface, with a longitudinal clearance of less than 5% of a maximum longitudinal dimension measured between the axial proximal surface and the distal surface.

13. The female connector element according to claim 1, wherein, in an unconnected configuration of the female connector element, a minimum inner diameter of the seal is defined by an inner dimension of the lip.

14. The female connector element according to claim 1, wherein the base is in outer radial contact with the body.

15. A connector comprising a female connector element, and a complementary nipple, the nipple being provided with
an inner channel for passage of fluid
an outer cavity for receiving the locking members of the female connector element, in the connected configuration of the connector,
a front face surrounding the inner channel, and
a circumferential groove arranged on the front face,
wherein the female connector element is, according to claim 1 and wherein, in the connected configuration of the connector, the lip of the seal of the female connector element is engaged in, and in contact with, the circumferential groove.

16. The connector according to claim 15, wherein
a front axial surface of the body of the female connector element, turned forward, faces, along a direction parallel to the longitudinal axis, the locking members when they are in their inner position;
the lip extends in a volume located, radially to the longitudinal axis, inside the front axial surface; and
the lip protrudes forward, relative to the front axial surface, for a non-zero length
when the seal is in backward contact against the proximal surface, in alignment with the free front edge of the lip according to a direction parallel to the longitudinal axis, a ratio between,
a length over which the lip protrudes forward from the front axial surface of the body of the female connector element, and
a maximum depth of the circumferential groove relative to the front face, is greater than or equal to 1.

17. The connector according to claim 16, wherein the ratio is greater than or equal to 1.5.

* * * * *